United States Patent [19]

Szantho et al.

[11] Patent Number: 4,510,370
[45] Date of Patent: Apr. 9, 1985

[54] FUSING MACHINE

[75] Inventors: Charles F. Szantho, Roselle Park; Edward D. Riordan, S. Somerville, both of N.J.

[73] Assignee: Joyal Products, Inc., Linden, N.J.

[21] Appl. No.: 522,099

[22] Filed: Aug. 11, 1983

Related U.S. Application Data

[62] Division of Ser. No. 364,218, Apr. 1, 1982, , which is a division of Ser. No. 203,446, Nov. 3, 1980, Pat. No. 4,371,772.

[51] Int. Cl.³ .............................................. B23K 9/28
[52] U.S. Cl. .............................. 219/86.25; 219/86.33; 219/86.41
[58] Field of Search ................. 219/86.1, 86.25, 86.33, 219/86.7, 89

[56] References Cited

U.S. PATENT DOCUMENTS 3,045,103 7/1962 Warner .......................... 219/86.41

FOREIGN PATENT DOCUMENTS 2717453 10/1978 Fed. Rep. of Germany ... 219/86.25

Primary Examiner—Roy N. Envall, Jr.
Assistant Examiner—C. M. Sigda
Attorney, Agent, or Firm—Lerner, David, Littenberg, Krumholz & Mentlik

[57] ABSTRACT

A fusing machine utilizes a fusing electrode assembly and a ground electrode assembly suspended from the fusing electrode assembly. The fusing electrode assembly includes a lower fusing electrode shaft and an upper fusing electrode shaft. The lower fusing electrode shaft has an open end adapted to receive the upper fusing electrode shaft and a compression spring interposed between the shafts. An adjustable stop is threaded onto the upper fusing electrode shaft to limit the downward movement of the upper fusing electrode shaft. The lower fusing electrode shaft is keyed to a fusing electrode holder formed from a plurality of keyed members. The ground electrode assembly includes an adjusting mechanism, whereby the position of a ground electrode carried by the ground electrode assembly can be adjusted relative to a fusing electrode carried by the fusing electrode assembly. The fusing electrode assembly and the ground electrode assembly are mounted to a frame which is adjustably attached to a supporting structure.

9 Claims, 10 Drawing Figures

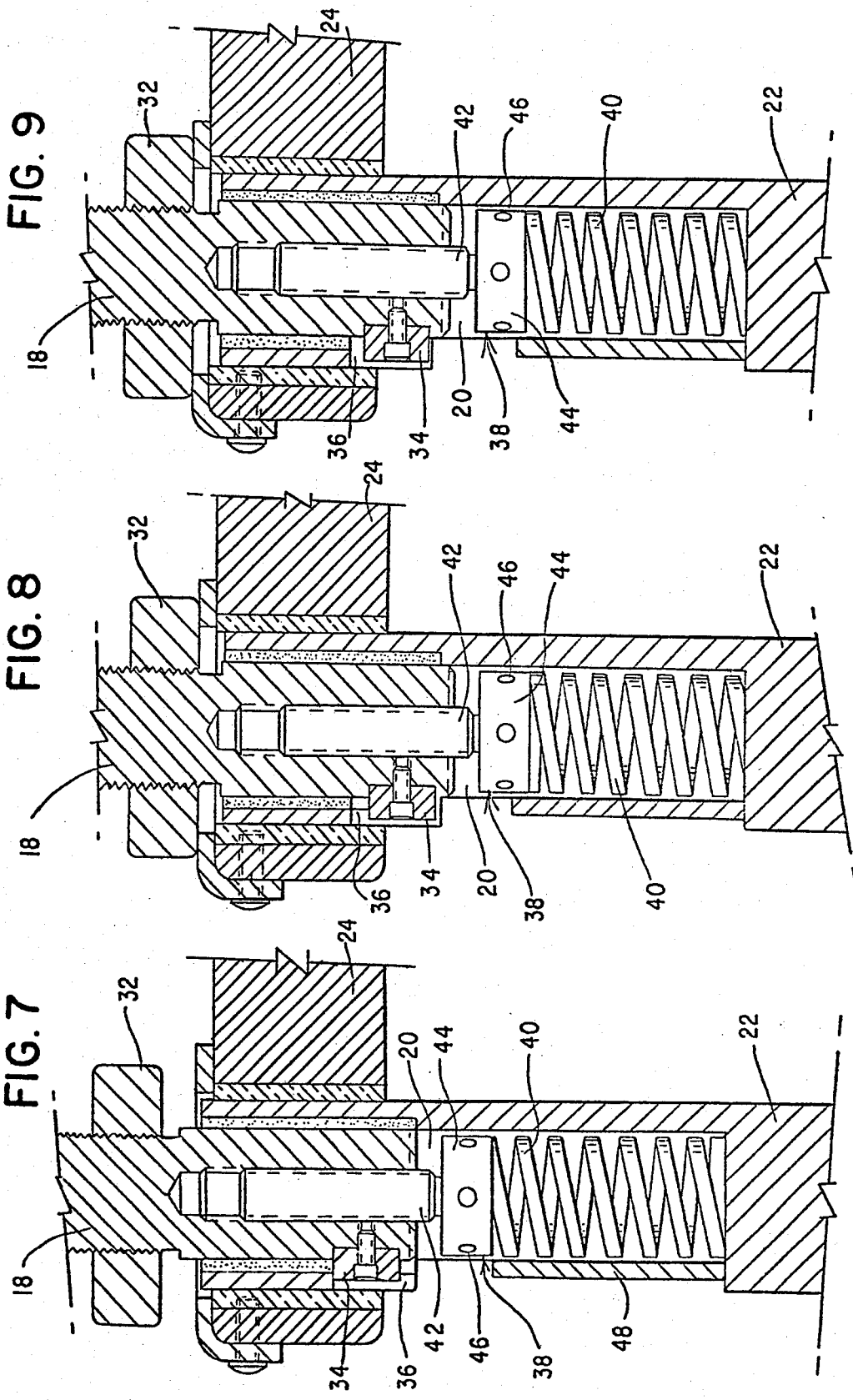

FUSING MACHINE

This is a division of application Ser. No. 364,218, filed Apr. 1, 1982 which is a division of application Ser. No. 203,446, filed Nov. 3, 1980, now U.S. Pat. No. 4,371,772.

FIELD OF THE INVENTION

The present invention relates to fusing machines, and, more particularly, to such machines which are especially adapted to fuse or spot weld electric motor armature wires to commutator bars. These apparatus generally include a pair of electrodes which constitute the terminals of a welding circuit and means for moving the electrodes into and out of contact with the parts to be welded or fused, the fusing or welding operation taking place at the point of contact between one of the electrodes and the parts to be fused or welded.

BACKGROUND OF THE INVENTION

Fusing machines have been in existence for many years. In Warner U.S. Pat. No. 3,045,103, there is disclosed a fusing machine which has been marketed successfully for a number of years by the assignee of the present invention. Despite the commercial success of the fusing machine of the Warner patent, the machine has room for improvement. For instance, the prior fusing machine employs a fusing electrode assembly, including a fusing electrode shaft and a pair of counteracting springs, i.e., a weld following spring for pressing a fusing electrode into contact with a workpiece and a return spring for moving the fusing electrode out of contact with the workpiece. Because the return spring acts against the weld following spring, it is difficult to properly compress the weld following spring, making it difficult to achieve consistent welds. The weld following spring is also difficult to replace, thereby increasing machine down time during spring changing operations.

The fusing electrode assembly also utilizes a reciprocating guide pin and a reciprocating stop shaft, both of which are arranged parallel to the fusing electrode shaft. Because of such a parallel arrangement, the fusing electrode shaft can pivot relative to the guide pin and the stop shaft and, therefore, become jammed during its reciprocating movement in a bearing bracket.

In the prior fusing machine, the fusing electrode is simply clamped between a pair of jaws attached to the fusing electrode shaft. Because the jaws are only held together by screws, the jaws can move laterally relative to each other, resulting in an undesired lateral movement of the fusing electrode. The lateral movement of the fusing electrode complicates its proper alignment and positioning.

The fusing electrode assembly is mounted to a main frame, including a bed attached to the main frame. The bed carries an armature-commutator holding and indexing mechanism. The bed is adjustable so that its position can be varied to compensate for various sized commutators. Because the position of the armature-commutator holding and indexing mechanism changes in response to the movement of the bed, different sized commutators must be fed to the armature-commutator holding and indexing mechanism at different elevations, thereby complicating feeding operations. If all of the commutators are fed at the same elevation, then fusing operations must be periodically interrupted to adjust the position of the bed and, hence, the armature-commutator holding and indexing mechanism in order to receive different sized commutators and properly position them relative to the fusing electrode and a ground electrode.

SUMMARY OF THE INVENTION

Many of the problems and shortcomings of the prior art device described above are overcome by the present invention in which a fusing electrode assembly utilizes a single spring designed to perform a weld following function. The spring is positioned in an open end of a lower fusing electrode shaft, the spring being readily accessible for easy installation and replacement. The lower fusing electrode shaft carries a fusing electrode holder which includes a guide pin arranged perpendicular to the lower fusing electrode shaft and designed to prevent rotation of the fusing electrode assembly about its longitudinal axis.

The fusing electrode assembly also includes an upper fusing electrode shaft which is mounted for reciprocating movement in the open end of the lower fusing electrode shaft, the spring being interposed between the upper fusing electrode shaft and the lower fusing electrode shaft. The upper fusing electrode shaft carries an adjustable stop, which is arranged coaxially therewith and designed to limit the downward movement of the upper fusing electrode shaft, and a spring adjusting member, which is designed to adjust the preload compression of the spring so that different spring requirements will not necessarily require spring replacement.

In one embodiment, the fusing electrode holder includes an upper holding member, which is keyed to the lower fusing electrode shaft, and a lower holding member, which is keyed to the upper holding member and adapted to adjustably receive the fusing electrode. The keyed connections cooperate to rigidly support the fusing electrode, thereby facilitating its proper alignment and positioning for the successful performance of a fusing operation. The keyed connection between the upper and lower holding members also facilitates heat transfer between the upper and lower holding members, thereby facilitating the cooling of the fusing electrode.

A ground electrode assembly, which carries a ground electrode, is suspended from the fusing electrode assembly. The ground electrode assembly includes an adjusting member designed to adjust the position of the ground electrode relative to the fusing electrode.

The fusing electrode assembly and the ground electrode assembly are mounted to a frame, which is adjustably attached to a supporting structure. By adjusting the position of the frame, the positions of the fusing electrode and the ground electrode relative to a stationary workpiece work station can be adjusted without having to adjust the position of the work station, thereby facilitating the feeding of workpieces to the work station.

BRIEF DESCRIPTION OF THE DRAWINGS

For a more complete understanding of the present invention, reference may be had to the following description of an exemplary embodiment taken in conjunction with the accompanying figures of the drawings, in which:

FIG. 7 is a cross-sectional view, taken along line V—V in FIG. 1 and looking in the direction of the arrows, of a fusing electrode spring assembly utilized in connection with the fusing head assembly shown in FIGS. 1 and 2;

FIG. 8 is a cross-sectional view showing the fusing electrode spring assembly of FIG. 7 in a different stage of operation from the stage of operation illustrated in FIG. 7;

FIG. 9 is a cross-sectional view showing the fusing electrode spring assembly of FIGS. 7 and 8 in a stage of operation different from the stages of operation shown in FIGS. 7 and 8.

DESCRIPTION OF AN EXEMPLARY EMBODIMENT

Figure 1:
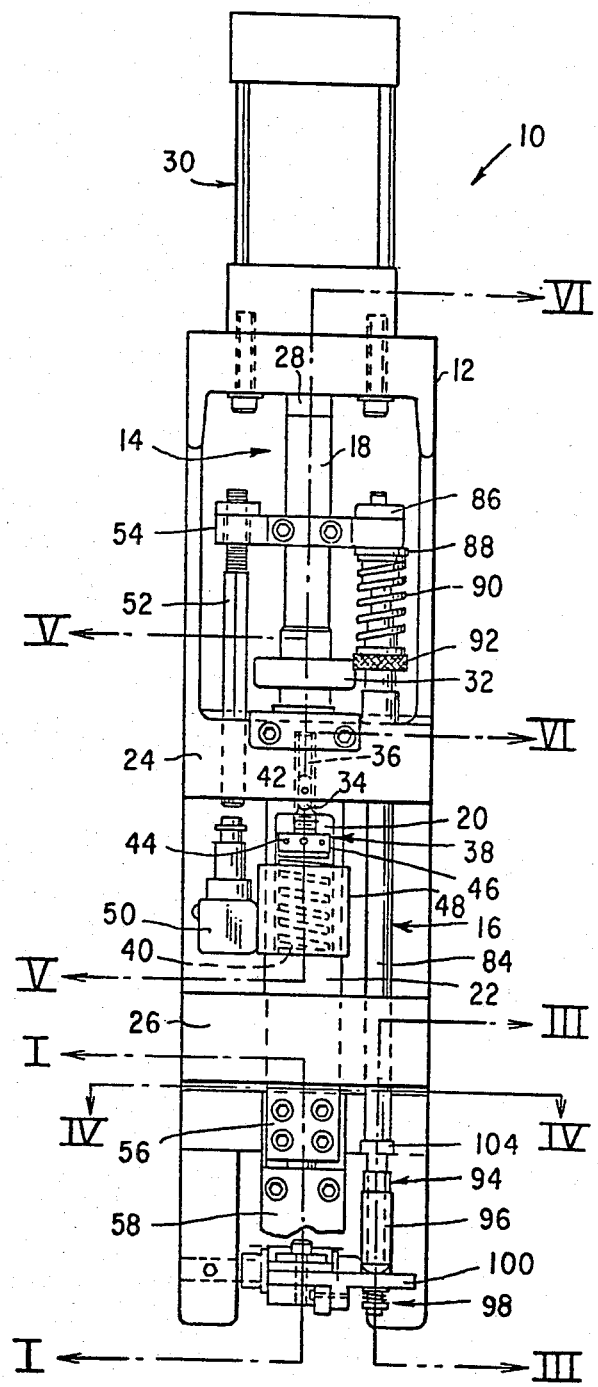
FIG. 1 is a front elevational view an exemplary embodiment of a fusing head assembly constructed in accordance with the present invention.

Referring to FIGS. 1-10, there is shown a fusing head assembly 10 having a head support 12 which includes a fusing electrode assembly 14 and a ground electrode assembly 16. The fusing electrode assembly 14 includes an upper fusing electrode shaft 18, which is slidably received in an open chamber 20 provided in a lower fusing electrode shaft 22. The lower fusing electrode shaft 22 is mounted for vertical reciprocating movement in an upper bearing block 24 and a lower bearing block 26.

An extensible piston rod 28 of a double-acting pneumatic cylinder 30 is pinned to the upper end of the upper fusing electrode shaft 18 for raising and lowering the fusing electrode assembly 14. The upper fusing electrode shaft 18 carries a stop 32, which is threaded onto the upper fusing electrode shaft 18 so that the position of the stop 32 can be adjusted. The lower end of the upper fusing electrode shaft 18 carries a key 34, which rides in a slot 36 (see FIGS. 7-9) formed in the lower fusing electrode shaft 22, and a spring adjusting member 38 for preloading a compression spring 40 housed in the chamber 20 of the lower fusing electrode shaft 22.

The spring adjusting member 38 has a shaft 42 threadedly received in the lower end of the upper fusing electrode shaft 18 and a contact head 44 which engages the upper end of the spring 40. Holes 46 are provided in the contact head 44 for rotating the spring adjusting member 38 so as to vary the position of the contact head 44 relative to the upper fusing electrode shaft 18 and, hence, the preload compression of the spring 40.

The spring 40 is maintained in the chamber 20 by a cover plate 48 removably attached to the lower fusing electrode shaft 22. The cover plate carries a firing switch 50 which cooperates with an actuating rod 52, attached by a bracket 54 to the upper fusing electrode shaft 18, so as to control the actuation of a weld controller (not shown).

Figure 2:
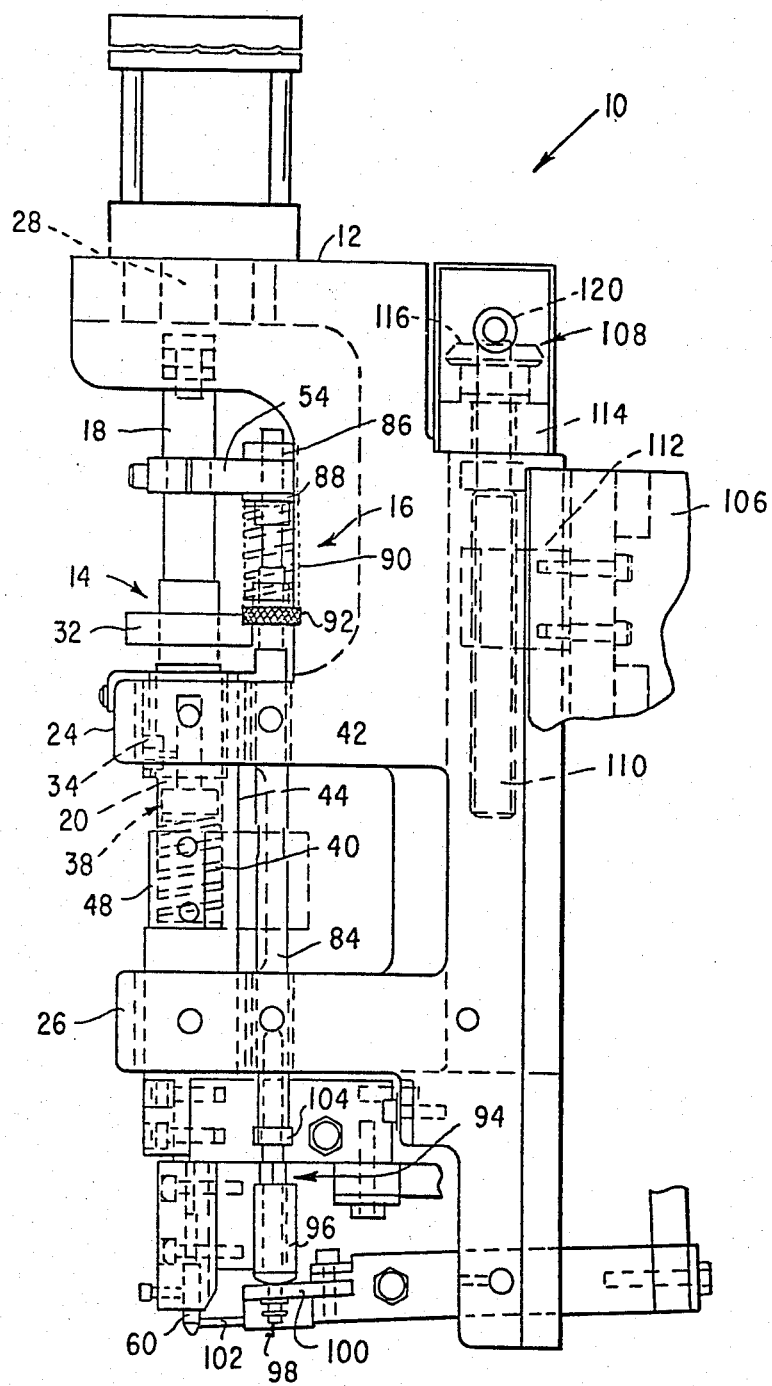
FIG. 2 is a right side elevational view of the fusing head assembly shown in FIG. 1.
Figure 3:
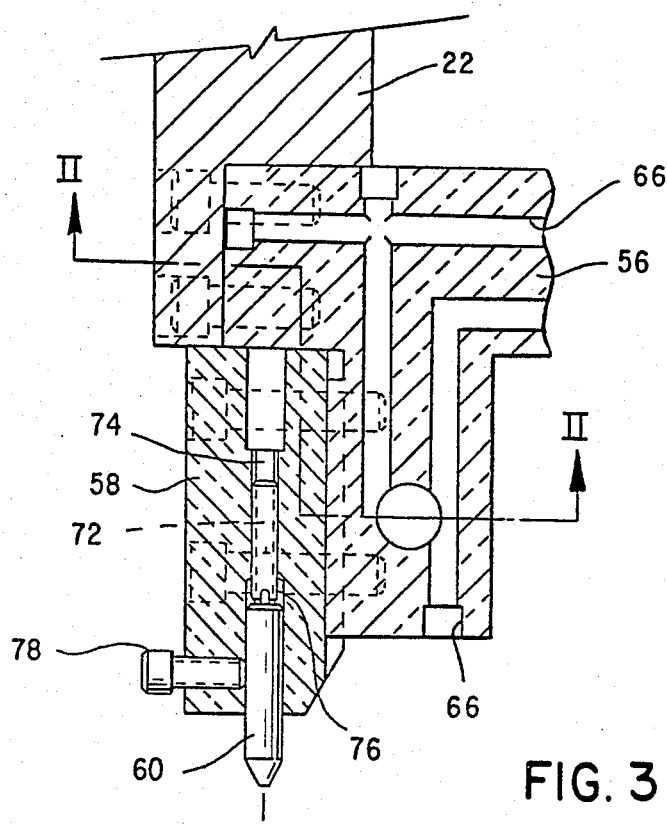
FIG. 3 is a cross-sectional view, taken along line I—I in FIG. 1 and looking in the direction of the arrows, of a fusing electrode assembly utilized in connection with the fusing head assembly illustrated in FIGS. 1 and 2.
Figure 4:
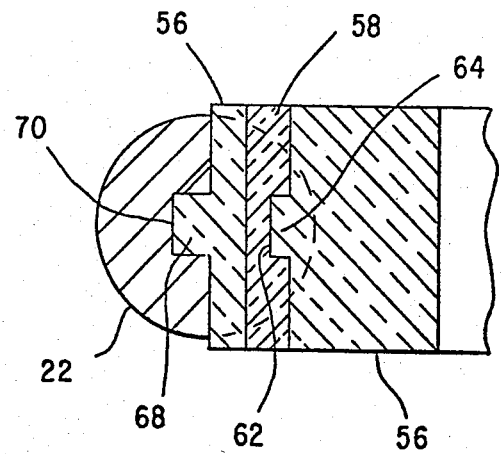
FIG. 4 is a cross-sectional view, taken along line II—II in FIG. 3 and looking in the direction of the arrows, of the fusing electrode assembly shown in FIG. 3.

The lower end of the lower fusing electrode shaft 22 is removably attached to an upper electrode holder 56, which is removably attached to a lower electrode holder 58 adapted to hold a fusing electrode 60 (see FIG. 2). With particular reference to FIGS. 3 and 4, a keyway 62 formed in the lower electrode holder 58 receives a key 64 formed on the upper electrode holder 56, which is provided with waterways 66 for cooling the upper electrode holder 56, as well as the lower electrode holder 58 and the fusing electrode 60. The upper electrode holder 56 has a key 68 which is received in a keyway 70 formed in the lower fusing electrode shaft 22. The position of the fusing electrode 60 can be varied by an adjusting screw 72 threadedly received in a hole 74 which communicates with a hole 76 adapted to receive the fusing electrode 60. A set screw 78 secures the fusing electrode 60 in place in the hole 76 of the lower electrode holder 58. The keys 64, 68 cooperate with the keyways 62, 70, respectively, to rigidly support the fusing electrode 60 and to ensure its proper alignment and position for the successful performance of a fusing operation. The key 64 and the keyway 62 also cooperate to promote heat transfer between the upper electrode holder 56 and the lower electrode holder 58, thereby facilitating the cooling effect that the upper electrode holder 56 has on the lower electrode holder 58 and the fusing electrode 60.

Figure 6:
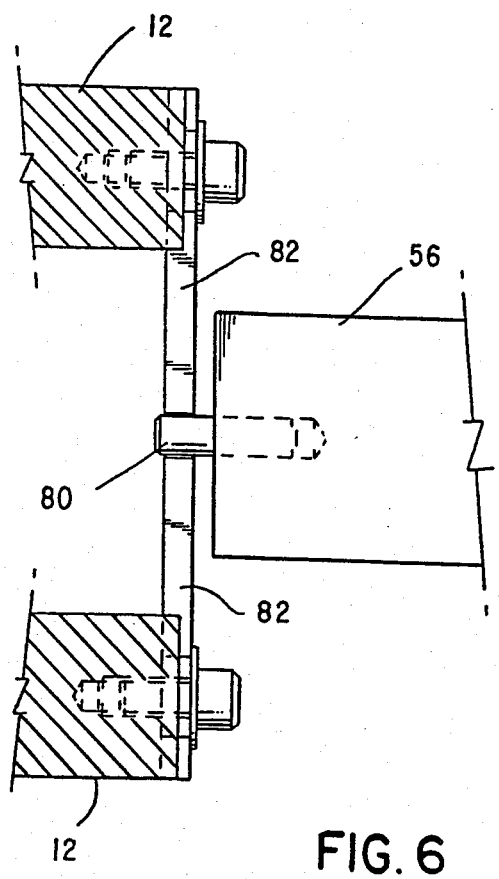
FIG. 6 is a cross-sectional view, taken along line IV—IV in FIG. 1 and looking in the direction of the arrows, of a guiding mechanism for the fusing electrode assembly of FIGS. 3 and 4.

Referring now to FIG. 6 in particular, the upper electrode holder 56 has a pin 80 which travels between a pair of guide plates 82 attached to the head support 12. The pin 80 and the plates 82 cooperate to prevent the fusing electrode assembly 14 from rotating about a vertical axis.

Referring again to FIGS. 1 and 2, the ground electrode assembly 16 includes a ground electrode shaft 84 which is attached to the upper fusing electrode shaft 18 by the bracket 54. A collar 86, which is threadedly attached to the upper end of the ground electrode shaft 84, cooperates which the bracket 54 to suspend the ground electrode shaft 84. A flanged washer 88 is slidably received on the ground electrode shaft 84 and resiliently urged against the lower surface of the bracket 54 by a compression spring 90 interposed between the flanged washer 88 and a flanged collar 92 threaded onto the ground electrode shaft 84. The position of the flanged collar 92 on the ground electrode shaft 84 can be adjusted to vary the preloading compression of the spring 90. The ground electrode shaft 84 is slidably received in the upper bearing block 24 and the lower bearing block 26.

Figure 5:
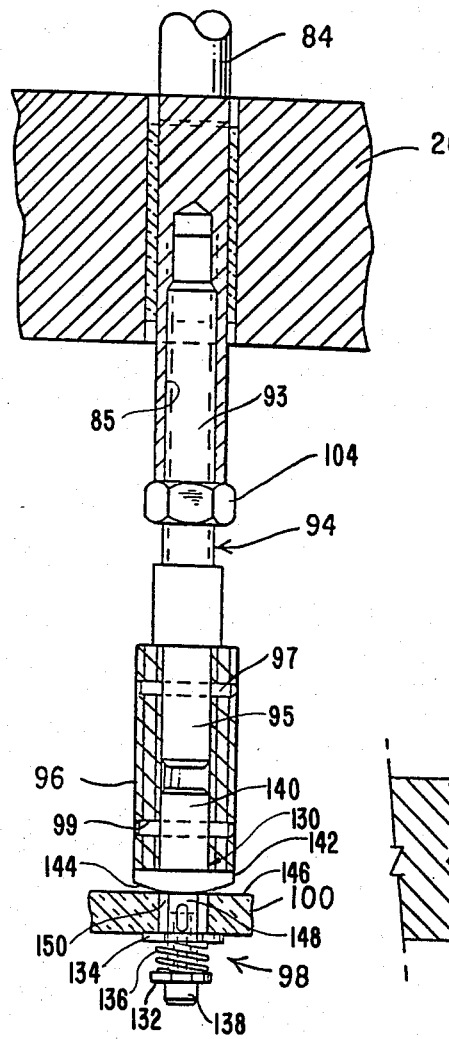
FIG. 5 is a cross-sectional view, taken along line III—III in FIG. 1 and looking in the direction of the arrows, of a ground electrode assembly employed by the fusing head assembly of FIGS. 1 and 2.

With reference to FIG. 5 in particular, the lower end of the ground electrode shaft 84 has a tap hole 85 which threadedly receives an upper end 93 of an adjusting member 94, having a lower end 95 which is attached to an insulating bushing 96. A pivot mechanism 98, which is attached to the bushing 96 by a pin 99, permits the pivotal movement of a support arm 100, which carries a ground electrode 102 (see FIG. 2). The pivot mechanism 98 includes a pressure pad 130, washers 132, 134, a compression spring 136 and a screw 138. An upper end 140 of the pressure pad 130 is attached to the bushing 96 by the pin 99. A central portion 142 of the pressure pad 130 has a spherical surface 144 which rolls along an upper surface 146 of the support arm 100. A lower end 148 of the pressure pad 130 extends through a slot 150 in the support arm 100 with enough clearance to allow the support arm 100 to pivot freely. The washers 132, 134, the compression spring 136 and the screw 138 cooperate to maintain the support arm 100 in contact with the spherical surface 144 of the pressure pad 130. A lock nut 104, threadedly received on the adjusting member 94, fixes the position of the adjusting member 94 relative to the ground electrode shaft 84. By loosening the nut 104 and rotating the adjusting member 94, the position of the ground electrode 102 relative to the fusing electrode 60 can be varied quickly and easily.

Figure 10:
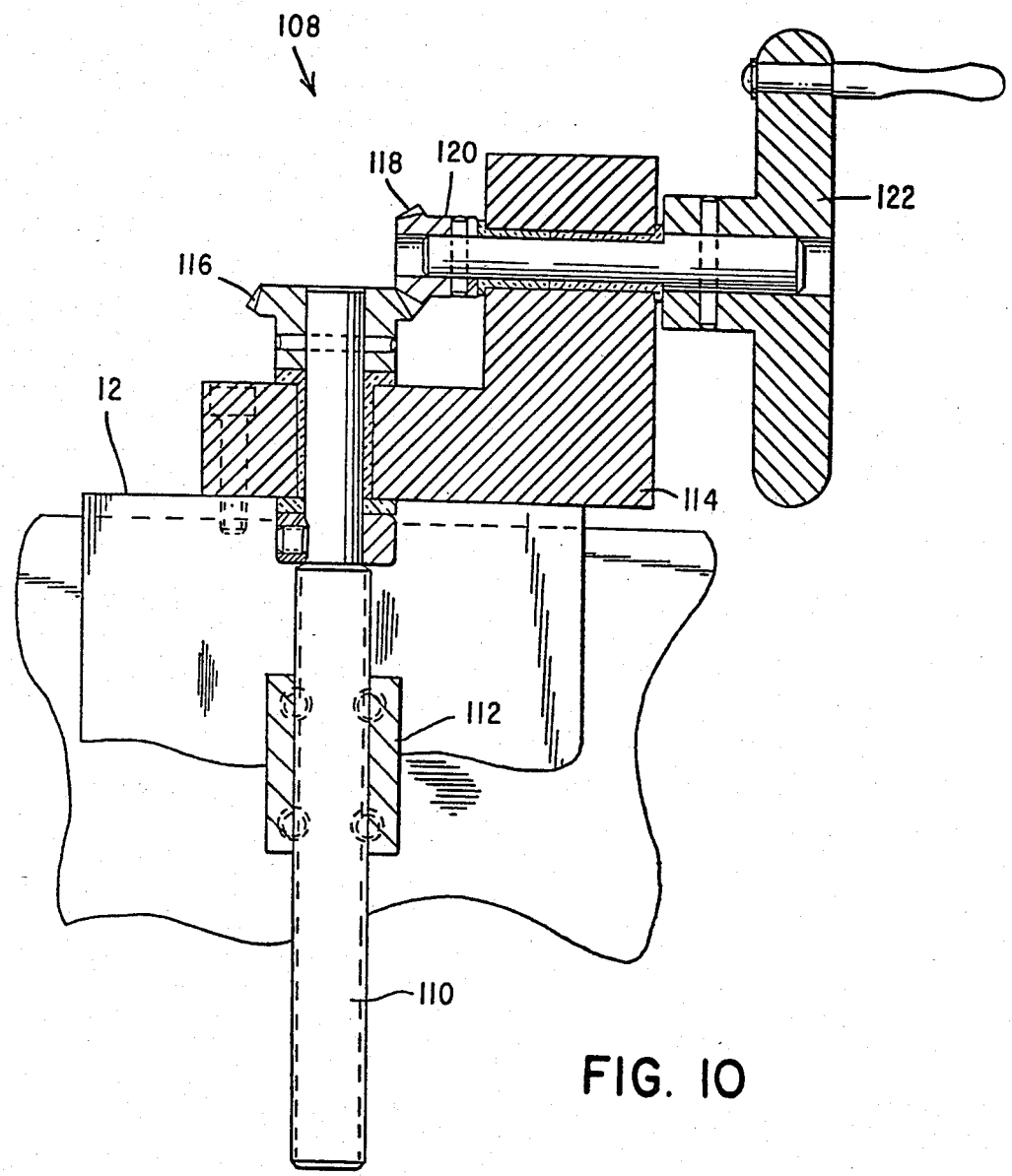
FIG. 10 is a cross-sectional view, taken along line VI—VI in FIG. 1 and looking in the direction of the arrows, of an elevating mechanism for the fusing head assembly of FIGS. 1 and 2.

As shown in FIGS. 2 and 10, the head support 12 is mounted for vertical reciprocating movement relative to a head box 106 by an elevating assembly 108, which includes a shaft 110 and a bracket 112 adapted to threadedly receive the shaft 110. The bracket 112 is fixedly secured to the head box 106. The upper end of the shaft 110 extends vertically through a mounting block 114, which is fixedly secured to the head support 12, and carries a large bevel gear 116, which is pinned to the shaft 110 for rotation therewith. A small bevel gear 118 (see FIG. 10), which is pinned to a shaft 120, meshes with the large bevel gear 116. The shaft 120, which is also pinned to a manually rotatable handwheel 122, extends horizontally through the mounting block 114. By rotating the handwheel 122, the position of the head support 12 relative to the head box 106 can be varied to vary the position of the head support 12 relative to a workpiece located below the fusing electrode 60 and the ground electrode 102.

In operation, the fusing electrode 60 and the ground electrode 102 are arranged in their respective rest positions above a workpiece (not shown). When the fusing electrode 60 and ground electrode 102 are in their rest positions, the distance between the fusing electrode 60 and the workpiece is slightly greater than the distance between the ground electrode 102 and the workpiece. After the fusing electrode 60 and the ground electrode 102 have assumed their rest positions, the cylinder 30 is actuated, extending the piston rod 28 and thereby causing the downward movement of the upper fusing electrode shaft 18. The spring adjusting member 38 moves downward conjointly with the upper fusing electrode shaft 18 to push the spring 40 and, hence, the lower fusing electrode shaft 22 downward, resulting in the downward movement of the upper and lower electrode holders 56, 58 and, therefore, the fusing electrode 60. The bracket 54 causes the ground electrode assembly 16 to move in synchronization with the fusing electrode assembly 14.

The downward movement of the ground electrode assembly 16 causes the ground electrode 102 to contact the workpiece, resulting in the further compression of the spring 90. The continued downward movement of the piston rod 28 causes the fusing electrode 60 to also contact the workpiece. Up to this stage of the operating cycle of the fusing head assembly 10, the upper fusing electrode shaft 18 and the lower fusing electrode shaft 22 occupy the positions shown in FIG. 7.

The piston rod 28 continues its downward movement after both the fusing electrode 60 and the ground electrode 102 have contacted the workpiece, thereby further compressing the spring 40 (see FIG. 8), as well as the spring 90, and causing the downward movement of the key 34 relative to the slot 36 (see FIG. 8). The downward movement of the upper fusing electrode shaft 18 is terminated when the stop 32 contacts the upper surface of the upper bearing block 24.

As the stop 32 contacts the bearing block, the firing switch 50 is actuated to initiate a fusing operation on the workpiece. The fusing operation causes the workpiece to heat up and melt. The spring 40 causes the fusing electrode 60 to move downward and follow the weld, i.e., to remain in contact with the unmelted portion of the workpiece, even though the downward movement of the upper fusing electrode shaft 18 has been arrested (see FIG. 9).

After the fusing operation is completed, the piston rod 28 is retracted, causing the key 34 to move upward relative to the slot 36. When the key 34 engages the closed end of the slot 36, the continued retraction of the piston rod 28 causes the key 34 to pull the lower fusing electrode shaft 22 upward conjointly with the upper fusing electrode shaft 18, thereby raising the fusing electrode 60 off of the workpiece. During the retraction of the piston rod 28, the bracket 54 contacts the collar 86 so that the ground electrode assembly is moved upwardly conjointly with the fusing electrode assembly 14, thereby raising the ground electrode 102 off of the workpiece. The fusing electrode 60 and the ground electrode 102 are automatically repositioned in their respective rest positions upon the complete retraction of the piston rod 28.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What we claim is:

1. A fusing machine, comprising a frame; a fusing electrode assembly mounted for reciprocating movement relative to said frame in a first direction, in which said fusing electrode assembly moves towards a workpiece, and a second direction opposite to said first direction; and a ground electrode assembly suspended from said fusing electrode assembly, said ground electrode assembly including a ground electrode shaft mounted for reciprocating movement relative to said frame in said first and second directions, pivotable supporting means for supporting a ground electrode such that said ground electrode is pivotable relative to said ground electrode shaft, said supporting means being positioned below said ground electrode shaft, and adjusting means connected between said ground electrode shaft and said supporting means for adjusting the position of said ground electrode in said first and second directions by pivoting said supporting means relative to said ground electrode shaft, said adjusting means including rolling means for rolling along said supporting means as said adjusting means moves in said first and second directions to pivot said supporting means relative to said ground electrode shaft and maintaining means for maintaining said rolling means in engagement with said supporting means.

2. A fusing machine according to claim 1, wherein said supporting means includes a support arm which is pivotally attached to said frame.

3. A fusing machine according to claim 2, wherein said adjusting means includes an upper member which is threadedly attached to said ground electrode shaft.

4. A fusing machine according to claim 3, wherein said adjusting means further includes a lower member which extends through a slot in said support arm, said slot being sized so as to provide said lower member with sufficient clearance to allow said support arm to pivot freely.

5. A fusing machine according to claim 4, wherein said rolling means includes a spherical surface on said lower member, said spherical surface being in contact with an upper surface of said support arm.

6. A fusing machine according to claim 5, wherein said maintaining means includes a spring positioned adjacent to a lower surface of said support arm.

7. A fusing machine according to claim 6, wherein said adjusting means further includes locking means for locking said upper member in position relative to said ground electrode shaft.

8. A fusing machine according to claim 7, wherein said upper member is externally threaded and said locking means includes a nut which is threadedly received on said upper member.

9. A fusing machine according to claim 8, wherein said adjusting means further includes an insulating bushing, said upper and lower members being received in and pinned to said bushing.

* * * * *

UNITED STATES PATENT AND TRADEMARK OFFICE
CERTIFICATE OF CORRECTION

PATENT NO.   : 4,510,370
DATED        : April 9, 1985
INVENTOR(S)  : Szantho et al.

It is certified that error appears in the above-identified patent and that said Letters Patent is hereby corrected as shown below:

Column 2, line 64, after "view" insert --of--; and

Column 4, line 62, after "96" insert --by a pin 97--.

Signed and Sealed this

Ninth Day of July 1985

[SEAL]

Attest:

DONALD J. QUIGG

Attesting Officer     Acting Commissioner of Patents and Trademarks